US00RE36647E

United States Patent [19]

Maupin et al.

[11] E Patent Number: Re. 36,647

[45] Reissued Date of Patent: Apr. 4, 2000

[54] SYSTEM FOR TRANSMITTING AND RECEIVING DIGITAL INFORMATION THROUGH PARALLEL PRINTER PORT OF COMPUTER BY USING EMBEDDING STROBE BIT IN EIGHT BIT DATA OF PRINTER PORT

[75] Inventors: Patrick Maupin; Tom Martin, both of Austin, Tex.

[73] Assignee: Video Associates Labs, Inc., Austin, Tex.

[21] Appl. No.: 09/204,937

[22] Filed: Dec. 3, 1998

Related U.S. Patent Documents

Reissue of:

[64] Patent No.: 5,581,795
Issued: Dec. 3, 1996
Appl. No.: 08/608,097
Filed: Feb. 28, 1996

U.S. Applications:

[63] Continuation of application No. 07/975,709, Nov. 13, 1992, abandoned.

[51] Int. Cl.[7] ..... G06F 15/02

[52] U.S. Cl. ..... 710/8; 710/2; 395/500.46

[58] Field of Search ..... 710/1, 2, 3, 5, 710/7, 8, 10, 12, 20, 36, 37, 58, 68; 395/500.45, 500.46, 500.48

[56] References Cited

U.S. PATENT DOCUMENTS

| | | | |
|---|---|---|---|
| 4,729,020 | 3/1988 | Schaphorst et al. | 348/419 |
| 4,812,847 | 3/1989 | Stewart et al. | 341/154 |
| 4,851,931 | 7/1989 | Parker et al. | 360/15 |
| 5,057,932 | 10/1991 | Lang | 386/101 |
| 5,133,079 | 7/1992 | Ballantyne et al. | 348/7 |
| 5,199,188 | 6/1992 | McCalley et al. | 348/6 |
| 5,262,875 | 11/1993 | Mincer et al. | 386/101 |
| 5,264,850 | 11/1993 | Khorran | 341/155 |
| 5,268,906 | 12/1993 | Free | 714/708 |
| 5,283,819 | 2/1994 | Glick et al. | 379/93.01 |
| 5,297,231 | 3/1994 | Miller | 704/201 |
| 5,303,349 | 4/1994 | Warriner et al. | 710/62 |
| 5,335,338 | 8/1994 | Proesel | 395/500.45 |
| 5,390,321 | 2/1995 | Proesel | 710/62 |

OTHER PUBLICATIONS

Ross M. Greenberg, "Adapting the parallel port for bidirectional communication", Microsoft System—Journal, Sep. 1990, pp. 107–118, V5, n5.

*Primary Examiner*—Moustafa M. Meky
*Attorney, Agent, or Firm*—Matthew J. Booth; Strasburger & Price L.L.P.

[57] ABSTRACT

A unique combination of software and hardware provides any computer with a system for high speed digital data communications using the computer's standard parallel printer port. The disclosed embodiment of the invention allows any computer with a standard parallel printer port to play or record digital audio sound allowing the computer to serve as a platform for multimedia presentations.

40 Claims, 7 Drawing Sheets

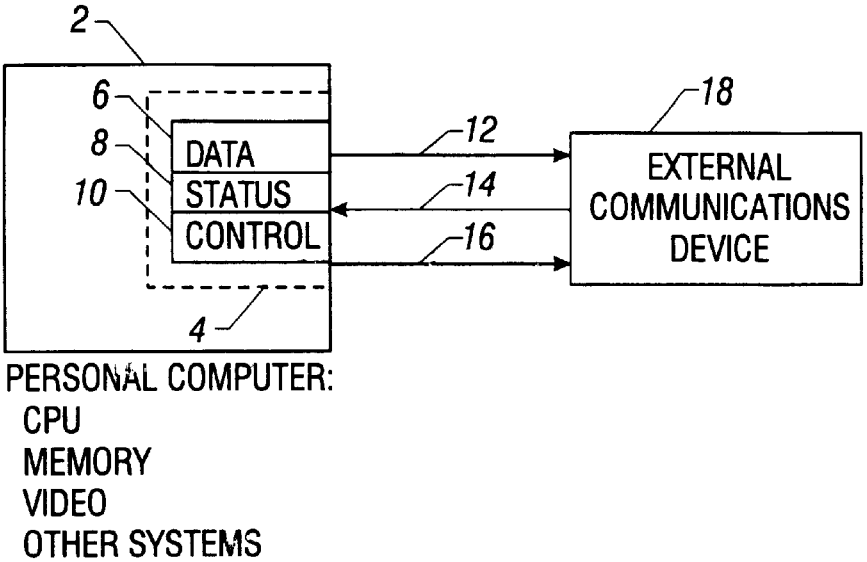

*FIG. 1*

| | | | |
|---|---|---|---|
| BASE ADDRESS | (PORT 0) | DATA PORT<br>0 BITS | (MAY BE BI-DIRECTIONAL OR OUTPUT ONLY) |
| BASE ADDRESS+1 | (PORT 1) | STATUS PORT<br><br>BITS 0-2:<br>BIT 3:<br>BIT 4:<br>BIT 5:<br>BIT 6:<br>BIT 7: | (INPUT ONLY)<br><br>NOT USED<br>-ERROR<br>SELECT<br>PE<br>-ACK<br>BUSY |
| BASE ADDRESS+2 | (PORT 2) | CONTROL PORT<br><br>BIT 0:<br>BIT 1:<br>BIT 2:<br>BIT 3:<br>BIT 4:<br>BITS 5-7: | (OUTPUT ONLY)<br><br>PRINTER<br>AUTO FEED<br>-PRINTER INIT<br>SELECT<br>IRQ ENABLE<br>NOT USED |

*FIG. 2*

```
NO-OP                +STROBE HIGH
NO-OP                +STROBE HIGH
  •
  •
  •
NO-OP                +STROBE HIGH

START COUNTER        +STROBE LOW
START COUNTER        +STROBE LOW
  •
  •
  •
START COUNTER        +STROBE LOW
STOP COUNTER         +STROBE HIGH
```

*FIG. 6*

```
LDS   SI, BUFFERPOINTER
MOV   CX, BUFFERSIZE
MOV   DX, IOPORT
CLI                        ; CLEAR INTERRUPTS FOR ACCURACY
REP   OUTSB                ; OUTPUT THE ENTIRE BUFFER
STI                        ; REENABLE INTERRUPTS
```

*FIG. 7*

```
    lds     si, srcPtr              ; pointer to buffer to be unpacked
    les     di, destPtr             ; pointer to destination buffer
    mov     dx, BytesInBuffer       ; number of bytes in first buffer
    mov     bx, BytesPerSample      ; port timing information
    cmp     bx, 1                   ; 1 is the normal case
    ja      2$                      ; jump for special cases

; Split one byte into 2, storing the data in the low order 4 bites,
; and toggling bit 7.

    mov     bx, 2                   ; loop invariant -- increment for DI
    mov     cx, 0FF0h               ; loop invariant -- mask for data
1$
    mov     al, ds:[si]             ; Copy the data into each half of AX,
    mov     ah, al                  ; then mask off half the data in AL
    and     ax, cx                  ; and the other half in AH.
    shr     al, 4                   ; Normalize the data to the lower 4 bits
    or      al, 80h                 ; Add in the strobe bit
    mov     es:[di], ax             ; Store the result
    inc     si                      ; Bump the pointers
    add     di, bx
    dec     dx                      ; Loop to do all the source data
    jnz     1$
    jmp     AllDone

; Fast parallel port handling.  Delay factor is in BX

2$
    mov     al, ds:[si]             ; Copy the data into each half of AX,
    mov     ah, al                  ; then mask off half the data in AL
    and     ax, 0FF0h               ; and the other half in AH.
    shr     al, 4                   ; Normalize the data to the lower 4 bits
    or      al, 80h                 ; Add in the strobe bit

    mov     cx, bx                  ; Store the byte in AL 'BX' times
    rep     stosb
    mov     al, ah                  ; Store the byte in AH 'BX' times
    mov     cx, bx
    rep     stosb
    inc     si                      ; Bump source pointer and
    dec     dx                      ; loop to do all the source data
    jnz     2$
StartOutput
    lds     si, destptr             ; point to unpacked data
    mov     cx, di                  ; end of buffer
    sub     cx, si                  ; - start of buffer
    rep     outsb                   ; output entire buffer
```

*FIG. 9*

SYSTEM FOR TRANSMITTING AND RECEIVING DIGITAL INFORMATION THROUGH PARALLEL PRINTER PORT OF COMPUTER BY USING EMBEDDING STROBE BIT IN EIGHT BIT DATA OF PRINTER PORT

Matter enclosed in heavy brackets [ ] appears in the original patent but forms no part of this reissue specification; matter printed in italics indicates the additions made by reissue.

This application is a Continuation of application Ser. No. 07-975,709 filed on Nov. 13, 1992, now abandoned.

BACKGROUND OF THE INVENTION

1. Field of the Invention

This invention relates to high speed digital data communications. More specifically, this invention relates to high speed bi-directional digital data communications through a standard parallel printer port of a computer to an external communications device. And even more specifically, this invention relates to the transmission of digital audio information through a computer's standard parallel printer port to an external digital audio adapter.

A portion of the disclosure of this patent document contains material that is subject to copyright protection. The copyright owner has no objection to the facsimile reproduction by anyone of the patent document or the patent disclosure, as the material appears in the Patent and Trademark Office patent file or records, but otherwise reserves all copyright rights whatsoever.

2. Description of the Related Art

The arrival of multimedia presentations gives owners of existing computers a whole slough of new and aggravating problems. Consider for example a computer user who wants to play or record digital audio sound using [their] *his* computer. Many of today's existing computers lack the ability to play or record digital audio sound so our computer user must look to acquire new hardware and software to add this capability to [their] *his* computers. One solution for achieving digital audio capability is for our computer user to buy an internal audio board to put into their computer. Unfortunately, a board level solution is not ideal for all applications for some of the following reasons: (1) the computer may not have any free slots available, (2) the computer may not have any slots at all as is true with most notebook computers, and (3) the computer user may not have the technical skills to install a board level product into the computer.

A better solution rectifying the above problems is to use an external communications device, with digital audio sound capability, that attaches easily to a computer's standard parallel printer port. Most, if not all computers, can print to a parallel printer. Since this type of device does not use slots, even the most unsophisticated computer user can install this type of device on [their] *his* computer.

However, an external communications device with the ability to play and record digital audio and that attaches to the parallel printer port only addresses the connection problem. A bigger part of the problem is that the standard parallel printer port, the interface mechanism if you will, is simply too slow in transmitting information for processing real time digital audio. The slow transmission speed of the parallel printer interface is even now starting to impact print speeds as printer resolutions approach 1000 dots per inch.

The other part of the problem is the overhead requirements of the parallel printer port interface on the host computer's CPU usage. An I/O instruction is a computer command intended to Input or Output data between the computer and an external device connected to a specific I/O port (or address). For example, when an 80386 or 80486 microprocessor (CPU)is operating in protected mode when running Microsoft Windows, each I/O instruction takes an extra 25 (80386) or 30 (80486) CPU clock cycles. These extra CPU clock cycles are necessary to verify that the current I/O instruction may use that particular I/O port. Repeated use of I/O instructions, obviously, incurs a high overhead on CPU usage.

Using the standard parallel printer interface in an IBM compatible computer for example, repeated I/O instructions are necessary for every eight bits of data sent through the parallel printer port using the required following sequence: (1) output the data to the parallel printer port, (2) set the parallel printer port strobe line (the data is available to the printer), and (3) reset the printer port's strobe line (the data is no longer available to the printer).

Another problem with using the parallel printer port is that not all "standard" parallel printer ports are equal. Even when using an IBM compatible computer and the parallel printer port interface as defined by IBM, there is a substantial difference in the maximum data throughput speeds for each computer's parallel printer port. This combination of factors makes using the parallel printer port for non-printer applications, other than printing to older parallel printers, an exceedingly slow operation.

The effective I/O channel transfer speed of a typical computer operating at a CPU speed of 33 MHz (clock cycles per second)when sending information through a standard parallel printer port slows down to a maximum possible I/O channel transfer speed of around 1 MHz for I/O instructions. Because of the combined necessity of preserving compatibility with older parallel printer port interfaces and the overhead requirements of the parallel printer interface, the effective I/O channel transfer speed for some of the fastest computers on the current market slows down even further to approximately 600 KHz. Since it takes two I/O instructions to deliver eight bits of data to the parallel printer port (for normal printer operations), the net I/O channel transfer speed is now 200 KHz (or 1.6 million bits per second).

If a digital audio device requires a transmission speed 16 bits of data 44100 times per second (44.1 kHz) to the device as does Compact Disk (CD) quality digital audio sound, the required transmission speed of the data is:

$$16 \text{ bits/sample} * 44100 \text{ samples/sec} = 705.6 \text{ Kbits/sec}$$

Therefore, a host computer must spend 705.6 Kbits/1.6 Mbits=44% of its CPU time just for the I/O operations involved in playing the digital audio, and this time does not include the time required to retrieve the digital audio information from storage or manipulating the digital audio information in memory. Even when compressing the digital audio to four bits per sample before transmission to an external communications device connected to a standard parallel printer port, the host CPU must still spend 11% percent of its time for playback of digital audio sound. In multimedia presentations, the combination of slow transmission speed and CPU overhead is unacceptable because the host computer also must attend to a myriad of other duties such as displaying graphics on the video screen or retrieving and processing other data.

OBJECT AND SUMMARY OF THE INVENTION

An object of this invention is to provide a system for transmitting digital audio information through a computer's standard parallel printer port.

A feature of this invention is that a computer's standard parallel printer port is capable of [hi-directional] *bi-directional* high speed transmission of digital information.

An advantage of this invention is that the high speed digital data communications link greatly reduces the host computer's CPU overhead normally associated with using the parallel printer interface.

This invention gives any computer with a standard parallel printer port a high speed hi-directional digital data communications link to a variety of external devices that can include network adapters (e.g., ethernet adapter), SCSI I/O adapters, and digital audio devices. Without modifying the hardware of the computer's standard parallel printer port, the external communications device, an integral part of the invention, attaches easily to the outside of the computer's parallel printer port. The combined invention can then easily transmit and receive high speed digital data information between the host computer and the external communications device using the computer's standard parallel printer interface.

To maximize the information throughput, the invention has two additional components. First, the invention determines the maximum speed for transmitting and receiving digital data information for any given computer's standard parallel printer port. And second, the invention compresses all digital data information before the information passes between the host computer and the external communications device.

As will become evident from the detailed description, this invention gives current computer users the luxury of using their existing computers to perform multimedia presentations that require playing or recording of digital audio sound.

DESCRIPTION OF THE DRAWINGS

To further aid in understanding the invention, the attached drawings help illustrate specific features of the invention. The following is a brief description of the attached drawings:

FIG. 1 is an overview of the invention that shows an external communications device connected to a standard parallel printer port of a personal computer.

FIG. 2 is a register map of the programming model for the standard parallel printer port.

FIG. 6 is a sample data stream for determining the speed of a computer's standard parallel port.

FIG. 7 is a code fragment for implementing the process of FIG. 5.

FIG. 9 is a code fragment implementing the process of FIG. 8.

DETAILED DESCRIPTION OF THE INVENTION

Figure 3:
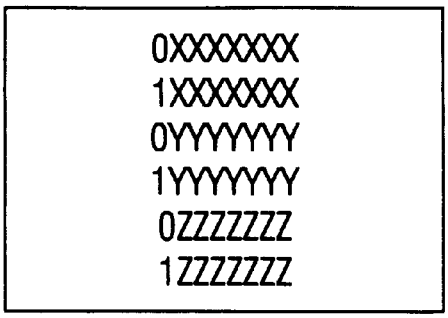
FIG. 3 is a sample seven bit data stream showing the use of an embedded strobe bit.

Consideration of the following example, which is purely exemplary, further clarifies the use of the invention.

One object of this invention is to provide a system for transmitting and receiving digital audio sound through a computer's standard parallel printer port. A major advantage of this invention is that the hardware of the computer's parallel printer port does not require modification. Rather, this invention achieves its high transmission speed by a unique combination of software techniques and external hardware.

The IBM personal computer, released in the early 1980s, set many de facto standards in the personal computer industry because of IBM's blue chip name, widespread availability, and open architecture. One of these standards was IBM's implementation of the venerable parallel printer interface. The IBM Personal Computer Technical Reference Manual, IBM part number 6025005 (revised April 1983), on [pages'] *pages* 1-117 through 1-122, describes the "standard" parallel printer [interlace] *interface* used for controlling a parallel printer; [pages'] *pages* 1-117 through 1-122 are incorporated herein by reference.

Turning now to the drawings, FIG. 1 shows an external communications device 18, the hardware component of the invention, attached to the standard parallel printer port interface 4 of a personal computer 2. The personal or host computer 2 contains a microprocessor as the central processing unit (CPU), memory, video subsystem, and other subsystems. One subsystem common to most personal computers is the standard parallel printer port interface 4. The parallel printer interface as used herein means a connection, having a plurality of wires, between the personal computer 2 and some external communications device 18. Examples of the possible uses for this invention include network adapters, SCSI I/O adapters, high speed printer buffers, as well as the disclosed embodiment: a digital audio sound adapter. The parallel printer port 4, from a programming model, consists of 3 modules: the data port 6, the status port 8, and the control port 10. Each port is an eight bit data port connected to, and a part of, the parallel printer interface. In other words, a single bit corresponds on a one to one basis with one of the wires in the parallel printer interface. However, the IBM standard parallel printer interface does not use all the wires, leaving some wires (or bits) unused. Therefore, the eight bit data port 6 consists of the eight-wire data port lines 12 connecting to the external communications device 18. In a similar fashion, the five bit status port 8 consists of the five-wire status port lines 14 connecting to the external communications device 18; and the four bit control port 10 consists of the four-wire control port lines 16 connecting to the external communications device 18. These three ports and seventeen signal wires constitute the electrical portion of the standard parallel printer port.

One skilled in the art knows the functionality of the standard parallel printer port; therefore, FIG. 2 briefly represents the register map of the programming model (of the hardware) for accessing a standard parallel printer port using an IBM compatible personal computer. The standard parallel printer port uses the following three adjacent register addresses (references are to FIG. 1): (1) the data port 6; the status port 8; and the control port 10. As shown by FIG. 2, the data port is either an eight bit data output only port, or is an eight bit bi-directional communications port with the proper software and hardware. The control port, besides its printer control duties, is nominally a four bit output port, and the status port is nominally a five bit input port.

The following description is the normal sequence of events for printing a single character when using the standard parallel printer port. First, the computer (or program) reads the status port to determine the printer's availability. If the printer is available, the computer outputs a character value to the data port. The computer then sets the hardware strobe bit, bit 0 within the control port, so that the printer knows that data is ready for transfer from the computer to the printer. The computer then resets the strobe bit so that the printer knows that data is no longer available for reading.

Most external devices using the parallel printer port interface use the hardware strobe line (bit 0) to clock the data on the leading edge (using only one edge) of the signal. As previously stated, using the hardware strobe line as a communication clock for high speed communications is not satisfactory. If we could clock the data using both edges of the clock signal then we could increase the data throughput. Indeed, clocking data on both edges of a clock signal is a well-known technique. In many such devices, the technique is to latch one register on the rising edge and a different register on the falling edge. The Sierra Semiconductors SC11486 RAMDAC in true color mode, for example, uses this technique. Even though clocking on both edges of the signal increases the data throughput for non-printer applications, the overall data throughput still is unsatisfactory for digital audio applications because of the overhead on the CPU's processing time that is necessary to use 2 I/O instructions to send eight bits of data through the parallel printer port.

A more effective way to increase the data throughput on a standard parallel printer port is to embed the strobe bit into one of the eight bits of the data being sent to the external communications device. With one of eight bits being used for the strobe, the other seven of eight bits are for data. Since this invention involves a hardware component, we effectively move the strobe detection circuit from the hardware strobe line (the normal location for printers) to the high bit (bit 7) of the data lines. Moving the strobe detection coupled with the above technique for clocking the data on the rising and falling edges of the clock allows this invention to utilize more efficiently the data channel by minimizing the CPU's I/O instruction access penalty. By controlling the design of the external communications device and how the device responds to the standard parallel printer interface, our invention does not require any modification to the hardware of the computer's parallel printer port.

In the late 1970's and early 1980's, the Cromemco Z80 personal computer, and probably several other early personal computer systems of that time, used the high bit of the data stream for I/O port selection on the Cromemco's parallel printer port (which was not an IBM compatible parallel printer port). The Cromemco computer's printer driver code sent a seven bit data value to the printer port. The Cromemco computer then forced the eighth bit high, and then set it low (which reset the strobe) while leaving the original seven data bits, unchanged, on the remainder of the port. Cromemco connected the hardware strobe line of the parallel printer interface to the high bit of the data port. This trick saved the hardware cost of an additional parallel port and I/O address decoder coupled only with the limitation of sending seven bit ASCII codes to the printer. When building the Cromemco computer, the cost of hardware was the limiting factor so designs during the period minimized additional hardware with a passion. The communication speed of the data channel was not a design objective because the Cromemco computer could operate much faster than the parallel printers of the day; moreover, the Cromemco computer was not capable of concurrently performing other tasks. As is evident, the early computers did not use the high bit as an embedded strobe for clocking as does the invention; rather, the Cromemco computer used the high bit of the data port only to control the hardware strobe line of the parallel printer interface.

Most CPU's (microprocessors) have block (or string) mode I/O instructions. A block mode instruction transfers or moves a block of data, from a couple of bytes to several thousands (or more) of bytes, more efficiently than repeated use of a single byte transfer or move instruction. The extra CPU cycle overhead associated with I/O instructions occurs only once at the start of the block I/O instruction, and as previously noted, an I/O instruction takes an extra 25 (80386) or 30 (80486) CPU clock cycles in 80×86 protected mode. The CPU overhead then drops to five CPU clock cycles for each data value transferred with the block I/O instruction. Since block mode I/O instructions can only transfer data to a single I/O port, these instructions are not useful for printer applications for sending data to a standard parallel printer because the block I/O instruction cannot alternate sending information between the data port and the control port (for setting and resetting the strobe bit). By embedding the strobe information into the data stream as discussed above, using the block mode I/O instruction for transferring information through a standard parallel printer port is now viable; provided however, the external communications device can decode strobe information in the data stream, not the hardware strobe line.

Turning to FIG. 3, consider a data format with seven data bits (bits 0–6) and an embedded strobe bit (bit 7). The embedded strobe is separate and distinct from the dedicated hardware strobe within the control port of the parallel printer port. If the rising edge of the embedded strobe bit causes the external communications device to latch and accept the data, the following six byte sequence will send twenty-one bits of data to the data port using a block I/O instruction. The block I/O instruction first sends the seven bit value XXXXXXX with a strobe bit of zero to the data port. The block I/O instruction again sends the same seven bit value XXXXXXX to the data port but this time with the strobe bit set to one. Sending the same data twice and toggling the strobe bit mimics the operation of the hardware strobe line, and this technique does not incur the CPU I/O overhead of accessing the hardware strobe line.

Assuming an I/O channel transfer speed of 1 MHz (theoretical maximum) for transferring data through a standard parallel printer port, two I/O channel transfer cycles per transferred data value, and seven bits of data per data value, our data communications speed through a standard parallel printer port is:

$$(1\ \text{MHz}*7\ \text{bits})/2\ \text{cycles}=3.5\ \text{Mbits/sec}$$

Or over twice the previously possible throughput.

We can double the performance again by clocking the data on each transition of the strobe bit, rather than on just the positive going edge. By sending the data value once instead of twice, the data communications speed increases to seven Mbits/second.

Figure 4:
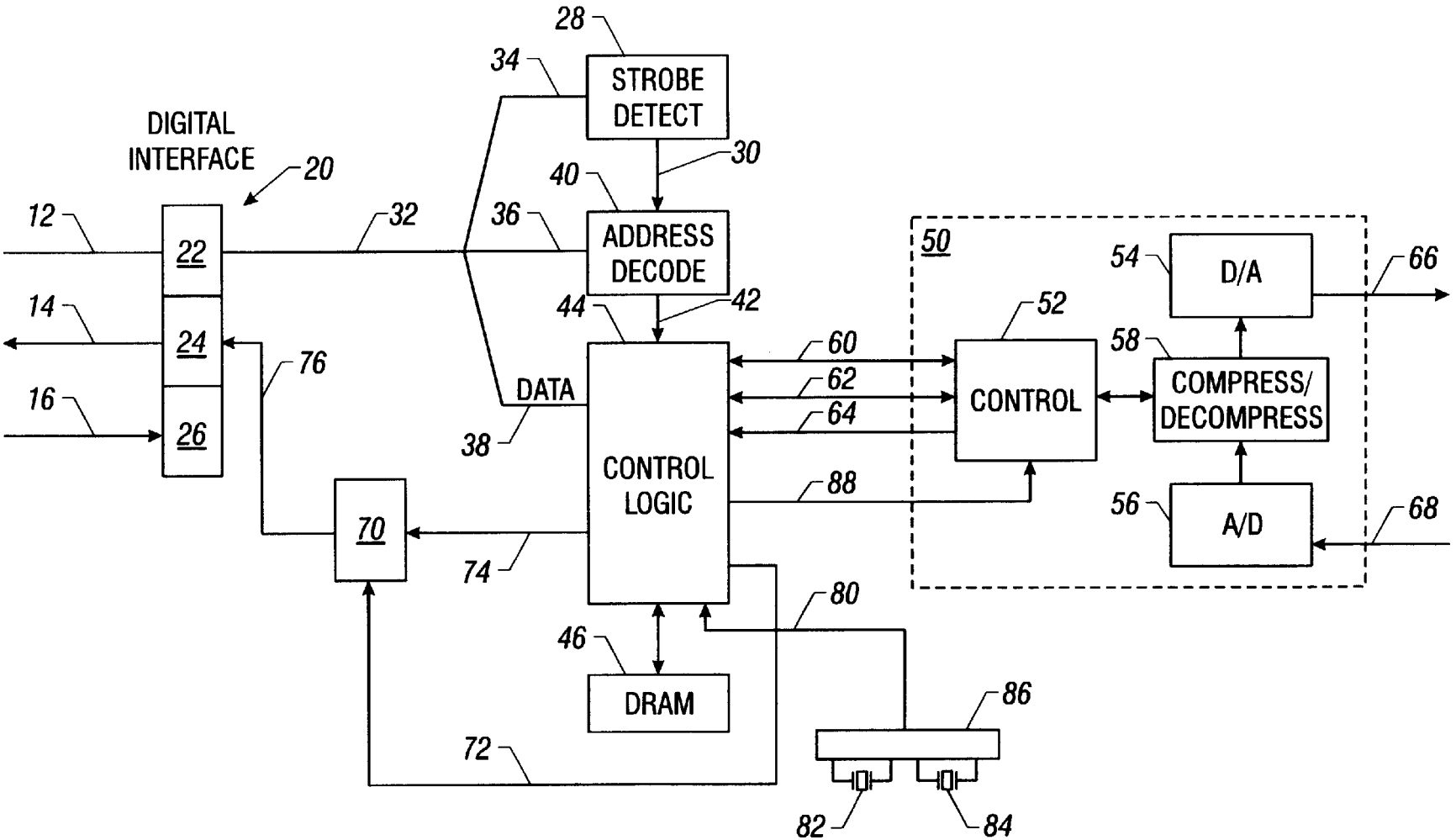
FIG. 4 is a block diagram of the hardware component of the invention.

FIG. 4 is a block diagram of an external communications device for transmitting and receiving compressed digital audio information between the device and a host computer. The data port lines 12, status port lines 14, and control port lines 16 connect to a digital interface 20 of the external communications device. The digital interface consists of: (1) a data interface circuit 22 that receives signals from the data port lines 12; (2) a status transmit circuit 24 that sends signals on the status port lines 14; (3) and a control receive circuit 26 that receives signals from the control port lines 16.

From the digital interface circuit 22, the internal data path 32 divides into three subgroups. The most significant bit (D7)is the embedded strobe bit 34. The next three bits (D6, D5, and D4) are the address bits 36. Lastly, the remaining four bits (D3, D2, D1, and D0) are the data bits 38.

As discussed later in the specification, the data is in a compressed format using the Adaptive Differential Pulse Code Modulation (ADPCM) compression technique that takes a twelve bit digital audio sample and turns that sample into a four bit representation of the sample.

The embedded strobe bit 34 connects to an edge transition strobe detect circuit 28 that detects when the embedded strobe bit 34 changes. The strobe detect circuit 28 generates the strobe signal 30. An edge transition detector is a well-known technique and generally involves an exclusive-or gate comparing the signal in question with a delayed representation of that signal. Due to the uncertainty in the settling time the various bits take to change to their new values, the strobe detect circuit 28 delays the strobe signal 30 until all the address bits 36 and data bits 38 are valid.

The address decoder 40 interprets the address bits 36, gates the address bits with the strobe signal 30 to generate the decoded address signals 42.

The control logic 44 uses the decoded address signals 42 as its command instruction signals. The command instruction signals form the basis for a command instruction set. The control logic 44 is a sequential state machine that in the disclosed embodiment consists of an Actel ACT1010A. The Actel gives the external communications device 18 the ability to perform a wide variety of functions. One skilled in the art, with this disclosure, can create a sophisticated command instruction set giving the external communication devices great flexibility. An example of some of the commands are as follows: start timer, stop timer, send contents of timer to host computer, play, record, store data into DRAM buffer, transfer record data to host. The control logic connects to the digital audio subsection 50 and to the DRAM buffer 46. The DRAM buffer 46, as the name suggests, buffers the data when either the host computer 2 or the external communications device 18 gets ahead of the other one (as in too fast) when transmitting digital information. The DRAM buffer 46 consists of a 256 kbytes×4 bit DRAM array. The preferred embodiment, however, uses approximately 64 kbytes of the buffer so as to reduce the addressing logic within the control logic 44. The disclosed 64 kbytes DRAM buffer 46 can store approximately 1.486 seconds of 44.1 kHz digital audio samples. Connected to the control logic 44 is the digital audio subsection 50. The digital audio subsection 50 consists of a digital audio control section 52, a digital to analog signal converter (D/A) 54 with its corresponding analog output 66, an analog to digital signal converter (A/D) 56 with its corresponding analog input 68, and a digital data compression/decompression section 58 employing the ADPCM system of data compression. These functions are well known in the art and available within a single integrated circuit such as the OKI Semiconductor MSM6388. The digital audio control logic 52 of the digital audio subsection 50 connects to the control logic 44 through the following: (1) a bidirectional data path 60; (2) a control path 62; and (3) the audio control clock 64. The audio control clock 64 effectively synchronizes data transfers between the digital audio subsection 50 and the control logic 44. The control logic 44 connects to the data selector 70 through the data control signals 72 and the data source signals 74. The data selector 70 selects the appropriate data source, and then delivers the selected data output 76 to the status transmit circuit 24 which in turn connects to the status port signal lines 14. The data sources within the external communications device include the counters and command registers within the control logic 44 and the contents of the DRAM buffer 46 (accessed through the control logic 44). Referring to FIG. 1, the host computer 2 receives the data from the external communications device 18 through the status port 8.

Finally regarding FIG. 4, the preferred embodiment contains two internal crystals 82 and 84 for timing purposes. Crystal 82 has a frequency of 8.192 MHz, and Crystal 84 has a frequency of 9.878 MHz. These two frequencies, when divided down properly, allow the digital audio subsystem to sample analog audio data with a sample range from around 3.6 kHz to 44.1 kHz. A frequency of approximately 3.6 kHz has the quality of a pocket micro recorder, while 44.1 kHz is the frequency for audio CD's and the latest Digital Audio Tape (DAT) drives. This broad range of sampling frequencies highly optimizes the disclosed embodiment for playing and recording digital audio sound. The host computer user, in the preferred embodiment, selects the appropriate sampling frequency that the software sends to the control logic 44. The oscillator crystal selection logic 86 connects the crystals 82 and 84 via the selected clock signal 80 to the control logic 44. Depending upon the selected frequency, the control logic 44 receives the selected clock signal 80 and further divides the signal either by 1 or by 4. The control logic 44 sends the resulting signal to the digital audio subsystem control logic 52 as the clock reference signal 88. The OKI MSM6388, the digital audio subsystem 50, has a range of user selectable internal clock dividers that divide the clock reference signal 88 to the selected sampling frequency. The control logic 44 next sends the digital audio subsystem 50 a command that selects one of the internal clock dividers so that the subsystem uses the appropriate sampling frequency.

Figure 5:
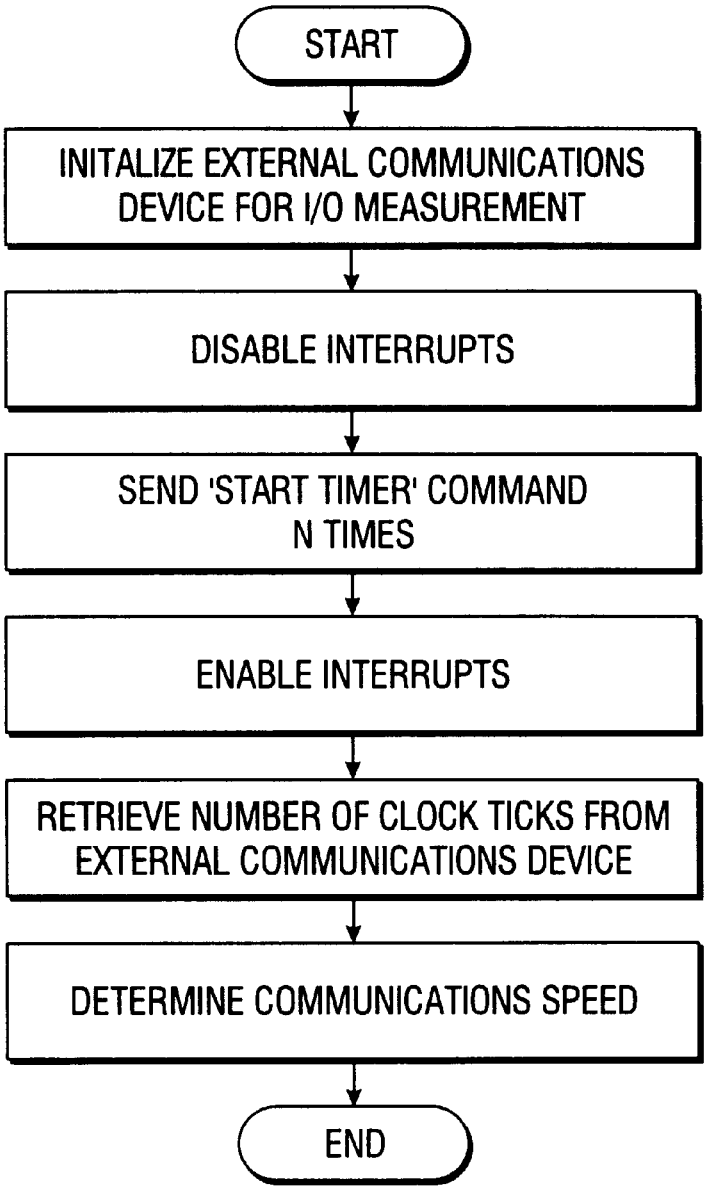
FIG. 5 is a flowchart describing the process for determining the speed of a host computer's standard parallel printer port.

One criterion for this invention is that the hardware of the host computer's parallel printer port interface remains unmodified. Due to the variance in the maximum possible speeds for each host computer's parallel printer port, and the differences in CPU clock speeds for each host computer, this invention must first determine the optimal data communication speed between the host computer and the external communications device. FIG. 5 is a flow chart representing the technique for determining the maximum data transfer rate of a particular computer/parallel printer port combination. Although the design of the invention is such that it can easily handle data as fast as most PCs can send it, future PCs may send data faster than the external communications device could accept it. This is really a two part problem. The first part is detecting whether the standard parallel printer port (i.e., the host computer driving the parallel printer port) is too fast for the external communications device, and the second part is slowing down the effective transfer rate of the host computer to compensate for the increased speed capability. The second problem is the easiest. If the computer can send data twice as fast as the external communications device can accept the data, simply send each data byte to the external communications device twice. If the computer can send data three times as fast, send each byte three times.

Determining the maximum data communications throughput of the host computer and the computer's standard parallel printer port is more difficult than slowing down the effective transfer rate. Referring to FIG. 4, the external communication device includes a programmable timer within the control logic 44 that counts clock cycles of one of the internal crystals 82 or 84. We can measure the standard parallel port's effective transfer rate by determining the time it takes to perform a set number of output instructions. Referring now to FIG. 5, the first step in the process is to disable interrupts in the host computer so that the timing data block (of FIG. 6) sent through the standard parallel printer port continues without interruption for a precise time measurement. The host computer then sends a command to the external communication device initializing it for a time measurement. The next step is creating a block of data to send to the external communications device. FIG. 6 shows the organization of the data block that consists of a number of dummy data values (or NO-0P instructions) with the embedded strobe bit high so that the external communications device knows not to read the data. The next part of the data block is a number of data bytes containing the 'start timer' command with the embedded strobe bit low. Sending a large number of 'start timer' commands ensures an accurate timing sample. The timer starts as soon as the control logic 44 decodes the 'start timer' command. By keeping the embedded strobe bit low, the external communications device sees only one 'start timer' command. The next step is transmitting several 'stop timer' commands with the embedded strobe bit high to the external communications device. This forces the external communications device to stop the timer as soon as it decodes the 'stop timer' command. The host computer then retrieves the number of clock cycles that it took for the external communications device to receive the data block of 'start timer' commands. Determining the data communication speed for the host computer to transmit a single data byte to the external communications device is as follows:

IOtransactions=number of 'start timer' commands sent

ClockTicks=number of external communications device counter ticks counted during 'IOtransactions'

CyclesPerOp=number of internal clock cycles it takes the external communications device to perform a given operation OutputsPerByte=number of output cycles performed for each byte of data to be sent to the external communications device then nominally, $$\text{OutputsPerByte}=1+(\text{IOtransactions}*\text{CyclesPerOp})/\text{ClockTicks}$$

Note that the above calculation uses integer (truncating) division.

FIG. 7 is a code fragment in 80×86 assembly language for implementing the method of FIG. 5. No particular programming language is necessary for carrying out the various procedures in this invention. Users of particular computers are aware of the language that is most suitable for their immediate purpose. For this invention, a combination of 80×86 assembly language and high level language was most satisfactory.

Figure 8:
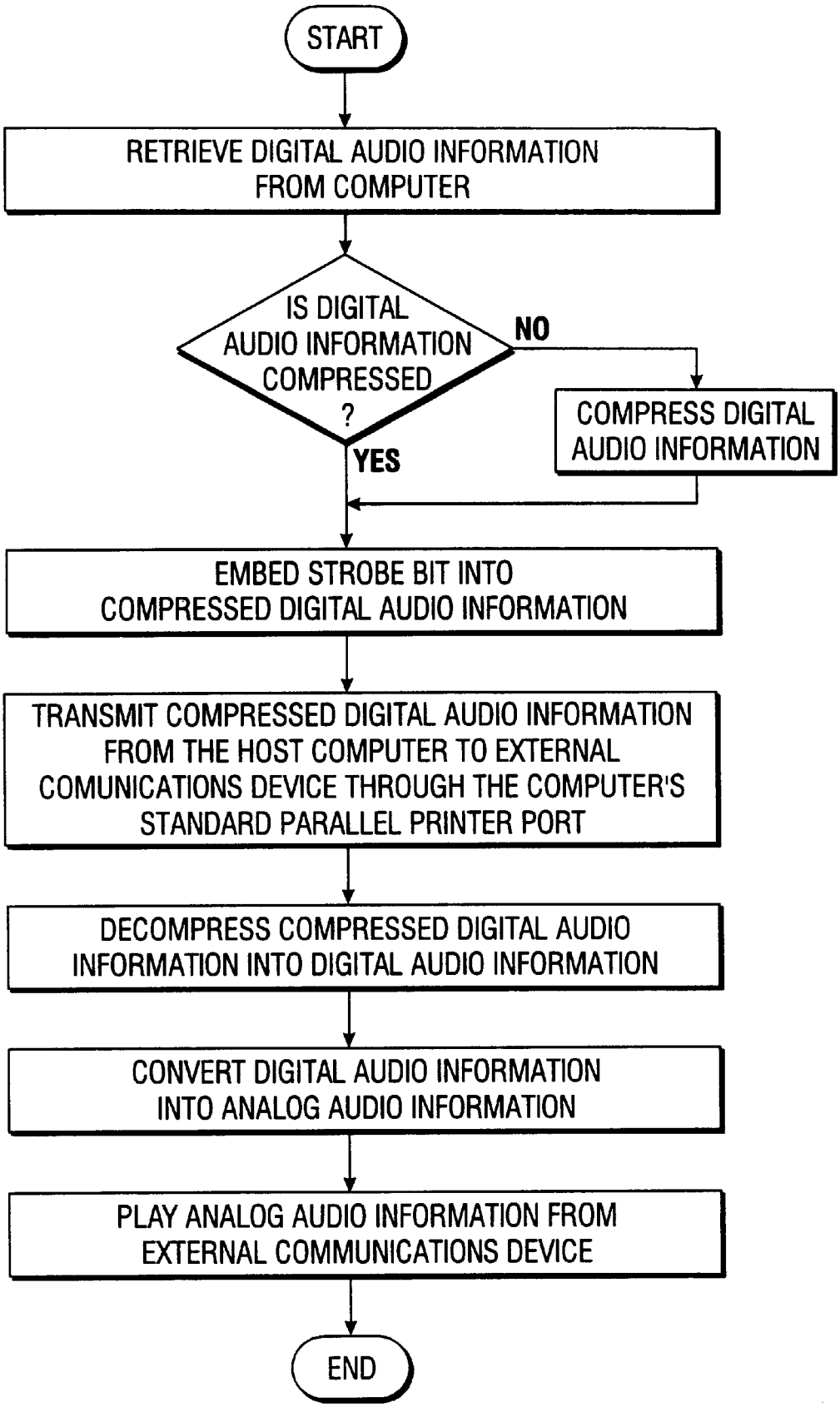
FIG. 8 is a flowchart describing the process for transmitting digital information through the standard parallel printer port of a host computer.

FIG. 8 describes the process for transmitting digital information through the host computer's standard parallel printer port to an external communications device attached to the computer's printer port. The first step in the transmit process is to send a command to the external communications device putting the device into the receive mode. The next step is to retrieve the digital audio information from the host computer's storage medium (e.g., a hard disk). As indicated by the code fragment of FIG. 9, we assume that the format of the digital information on the computer's storage medium is in a combined packed and compressed format. There is no requirement for storing the digital audio information in this format, but storing the data in this manner saves a great deal of space on the hard disk. An element of this invention, however, requires the digital audio information to be in a compressed format for transferring to the external communications device. The compression format used in the disclosed embodiment of this invention is the Adaptive Differential Pulse Code Modulation (ADPCM). The ADPCM technique in this invention takes a twelve bit sample of an analog audio sample, and then compresses and converts the audio sample into a four bit compressed digital audio sample. ADPCM is not a lossless compression method and is not suitable for all applications though it is entirely adequate for transferring digital audio information. If we were transferring video data using the invention, we would require a data compression technique that had less loss when transferring the digital information. Data compression techniques such as JPEG (Joint Photographic Experts Group) or MPEG (Motion Picture Experts Group) give far superior results for video images. In the disclosed embodiment, our choice of compression techniques was the result of using an OKI MSM6388 audio compression engine 50 (of FIG. 4).

With ADPCM compression, the data transfer through the parallel port interface required to support 44 KHz digital audio is now:

$$4\ \text{bits/sample}*44100\ \text{samples/sec}=176.4\ \text{Kbits/sec}$$

The maximum throughput for this invention is 7 Mbits/sec. As a result of using the four bit sample ADPCM compression in the disclosed embodiment, the maximum throughput for this embodiment is 4 Mbits/sec. The resulting overhead on the CPU is now:

$$(176.4\ \text{Kbits/sec})/(4\ \text{Mbits/sec})=4.4\%\ \text{of CPU time.}$$

The combined techniques of this invention reduce the CPU time required for transferring digital audio information through a standard parallel printer port interface from 44% to 4.4%.

The digital information residing on the host computer's storage medium in our disclosed embodiment is also in a packed format. The packed format takes advantage of the four bit sample of the ADPCM compression by putting two four bit samples into a single eight bit byte. The result is that the compressed digital audio information takes up less storage space on the host computer. Since our disclosed embodiment is transferring data as a four bit digital audio sample, we unpack the eight bit byte back into two separate four bit samples. FIG. 9 includes a code fragment for retrieving and unpacking the digital information.

Referring to FIG. 8, the next step in the process is embedding the strobe bit into the compressed digital audio information. After embedding the strobe bit, the host computer transmits the compressed digital audio information through its standard parallel printer port, using the previously described techniques, to the external communications device. FIG. 9 additionally includes a code fragment for transmitting the compressed digital audio information using a block I/O instruction. The external communications device then receives the compressed digital audio information. The digital audio subsection 50 (of FIG. 4) decompresses and converts the four bit compressed digital audio information into twelve bit digital audio information, and then converts the digital audio information into analog audio information. Analog audio is now available for playing from the external communications device.

The process for the host computer to receive digital information through its standard parallel printer port is very similar to the transmit process. Instead of the host computer receiving the digital information through the data port, however, the preferred embodiment receives the information through the status port. As previously discussed, not all computers have bi-directional data ports. Receiving digital information through the status port allows the invention to operate on a wider variety of computers without the need to modify the hardware of the host computer's parallel printer port. This method of receiving digital information is suitable for recording digital audio for several reasons. One, recording digital audio is usually not as time critical as the playback function. This means that the record function can utilize more of the host computer's CPU time. And second, the digital audio information is in a four bit format, and that makes the five bit input capability of the status port suitable for transferring the information. If the application is something other than giving computers digital audio capability like video information for example, then using the status port for receiving the digital information is not satisfactory. One skilled in the art, armed with the knowledge of this disclosure, can modify the software and hardware of this invention so that the external communication device transmits information to the host computer through the host computer's data port.

Figure 10:
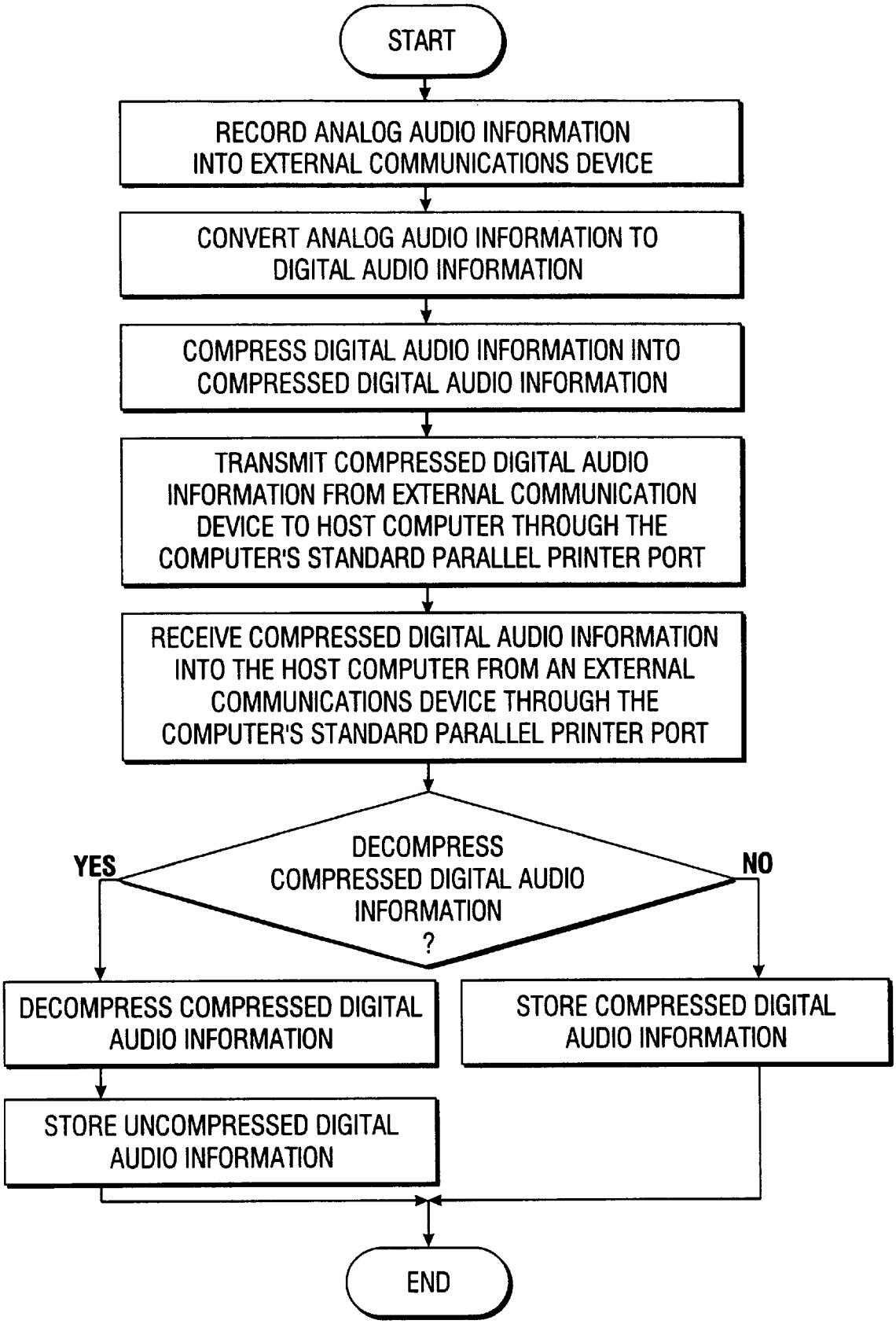
FIG. 10 is a flowchart describing the process for receiving digital information from the standard parallel printer port of a computer.

FIG. 10 describes the process for a host computer to receive digital information from its standard parallel printer port from an attached external communications device. The first step in the process is for the host computer to send a command to the external communications device telling the device to start processing audio information. After receiving the command, the external communications device begins converting and compressing the audio information into compressed digital audio information. As previously discussed, the external communications device uses the OKI MSM6388 audio compression engine 50 (of FIG. 4), which here is functioning as a twelve bit to four bit analog to digital converter. The OKI MSM6388 uses the ADPCM compression method to compress the information into the four bit compressed digital audio sample.

The next step in the process is for the external communications device to transmit the compressed digital audio information to the host computer. The host computer sends a command to the external communications device telling the device to transmit data to the computer. The host computer receives the compressed digital audio information from the external communications device through the host computer's standard parallel printer status port. This process continues until the host computer sends a command to the external communications device telling the device to stop processing information and to stop transmitting data to the host computer. After the host computer receives the information, the user has the option of decompressing the compressed digital audio information before storing the information on the host computer's storage medium, or the user can store the information in the compressed format. The compressed digital audio information, of course, takes less storage space, and since the information is in a four bit digital audio sample, the information packs easily into the two four bit samples per eight bit byte format as previously described.

This invention, as disclosed above, is a unique combination of software and hardware elements that transforms a computer with a standard parallel printer port into a multimedia presentation platform. Other embodiments of the invention are apparent to those skilled in the art after considering this specification or practicing the disclosed invention. The specification and examples above are exemplary only, with the true scope of the invention being indicated by the following claims.

We claim the following invention:

1. Apparatus for transmitting and receiving digital information through a parallel printer port, comprising:

a computer with a parallel printer port;

an embedded strobe combined with digital information, said embedded strobe further comprises one bit of the eight bit data port of said parallel printer port and said digital information comprises seven bits of said eight bit data port of said parallel printer port;

compressing means for compressing said digital information into compressed digital information;

means for transmitting and receiving said compressed digital information from said computer through said parallel printer port; and decompressing means for decompressing said compressed digital information.

2. The apparatus of claim 1 wherein said compressing means and said decompressing means comprise ADPCM compression means.

3. The apparatus of claim 1 further comprising determining means for determining the maximum transmission speed of said parallel printer port.

4. The apparatus of claim 1 further comprising the block move instruction of said computer.

5. The apparatus of claim 1 further comprising storage medium of said computer used to store said digital information on said computer.

6. Apparatus for transmitting and receiving digital information through a parallel printer port, comprising:

a computer with a parallel printer port;

means for embedding a strobe into digital information, said strobe further comprises one bit of the eight bit data port of said parallel printer port and said digital information comprises seven bits of said eight bit data port of said parallel printer port;

means for compressing said digital information into compressed digital information;

means for transmitting and receiving said compressed digital information from said computer through said parallel printer port; and decompressing means for decompressing said compressed digital information.

7. The apparatus of claim 6 wherein said compressing means and said decompressing means comprise ADPCM compression means.

8. The apparatus of claim 6 further comprising determining means for determining the maximum transmission speed of said parallel printer port.

9. The apparatus of claim 6 further comprising the block move instruction of said computer.

10. The apparatus of claim 6 further comprising storage medium of said computer used to store said digital information on said computer.

11. A method for transmitting and receiving digital information through a parallel printer port, comprising the steps of:

embedding a strobe into digital information, said strobe further comprises one bit of the eight bit data port of said parallel printer port and said digital information comprises seven bits of said eight bit data port of said parallel printer port;

compressing said digital information into compressed digital information;

transmitting and receiving said compressed digital information from a computer through a parallel printer port; and decompressing said compressed digital information into said digital information.

12. The method of claim 11 wherein said step of compressing and said step of decompressing use ADPCM compression.

13. The method of claim 11 further comprising the step of determining the maximum transmission speed of said parallel printer port.

14. The method of claim 11 further comprising the step of moving multiple-byte digital information using the block move instruction of said computer.

15. The method of claim 11 further comprising the step of storing the digital information on the storage medium of said computer.

16. A program storage device readable by a machine, tangibly embodying a program of instructions executable by the machine to perform method steps for transmitting and receiving digital information through a parallel printer port, said method steps comprising the following steps:

embedding a strobe into digital information, said strobe further comprises one bit of the eight bit data port of said parallel printer port and said digital information comprises seven bits of said eight bit data port of said parallel printer port;

compressing said digital information into compressed digital information;

transmitting and receiving said compressed digital information from a computer through a parallel printer port; and decompressing said compressed digital information into said digital information.

17. The program storage device of claim 16 wherein said step of compressing and said step of decompressing use ADPCM compression.

18. The program storage device of claim 16 further comprising the step of determining the maximum transmission speed of said parallel printer port.

19. The program storage device of claim 16 further comprising the step of moving multiple-byte digital information using the block move instruction of said computer.

20. The program storage device of claim 16 further comprising the step of storing the digital information on the storage medium of said computer.

*21. Apparatus that transfers digital information through a computer's parallel printer port, comprising:*

*an external communications device that transfers digital information through the computer's parallel printer port; and*

*an embedded strobe combined with said digital information that couples said external communications device, said embedded strobe further comprises one bit of the eight bit data port of the computer's parallel printer port and said digital information comprises seven bits of the eight bit data port of the computer's parallel printer port.*

*22. The apparatus of claim 21 wherein said external communications device further comprises a compression/decompression circuit, wherein said circuit compresses and decompresses said digital information.*

*23. The apparatus of claim 22 wherein said compression/decompression circuit utilizes the ADPCM data compression technique.*

*24. The apparatus of claim 21 wherein said external communications device further comprises a maximum data transfer speed measurement capability.*

*25. A method that transfers digital information through a parallel printer port of a computer, comprising:*

*embedding a strobe into digital information, said strobe further comprises one bit of the eight bit data port of the computer's parallel printer port and said digital information comprises seven bits of the eight bit data port of the computer's parallel printer port; and*

*transferring said digital information through the computer's parallel printer port.*

*26. The method of claim 25 wherein said digital information comprises compressed digital information.*

*27. The method of claim 26 wherein said compressed digital information comprises digital information compressed utilizing the ADPCM data compression technique.*

*28. The method of claim 25 further comprising determining the maximum transmission speed of the computer's parallel printer port.*

*29. A method that provides digital information with the ability to transfer through a parallel printer port of a computer, comprising:*

*providing a strobe embedded into digital information, said strobe further comprises one bit of the eight bit data port of the computer's parallel printer port and said digital information comprises seven bits of the eight bit data port of the computer's parallel printer port; and*

*coupling an external communications device to said digital information, said external communications device transfers said digital information through the computer's parallel printer port.*

*30. The method of claim 29 wherein said external communication device further comprises a compression/decompression circuit, wherein said circuit compresses and decompresses said digital information.*

*31. The method of claim 30 wherein said compression/decompression circuit utilizes the ADPCM data compression technique.*

*32. The method of claim 29 wherein said external communications device further comprises a maximum data transfer speed measurement capability that determines the maximum transmission speed of the computer's parallel printer port.*

*33. A system that transfer digital information through a computer's parallel printer port, comprising:*

*an external communications device that transfers digital information through the computer's parallel printer port;*

*an embedded strobe combined with said digital information that couples to said external communications device, said embedded strobe further comprises one bit of the eight bit data port of the computer's parallel printer port and said digital information comprises seven bits of the eight bit data port of the computer's parallel printer port.*

*34. The system of claim 33 wherein said external communications device further comprises a compression/decompression circuit, wherein said circuit compresses and decompresses said digital information.*

*35. The system of claim 34 wherein said compression/decompression circuit utilizes the ADPCM data compression technique.*

*36. The system of claim 33 wherein said external communications device further comprises a maximum data transfer speed measurement capability.*

*37. A program storage device readable by a machine, tangibly embodying a program of instructions executable by the machine to perform a method that transfers digital information through a parallel printer port of a computer, said method comprising:*

*embedding a strobe into digital information, said strobe further comprises one bit of the eight bit data port of the computer's parallel printer port and said digital information comprises seven bits of the eight bit data port of the computer's parallel printer port; and*

*transferring said digital information through the computer's parallel printer port.*

*38. The program storage device of claim 37 wherein said method of transferring digital information further comprises transferring compressed digital information.*

*39. The program storage device of claim 38 wherein said compressed digital information comprises digital information compressed utilizing the ADPCM data compression technique.*

*40. The program storage device of claim 37 wherein said method of transferring digital information further comprises determining the maximum transmission speed of the computer's parallel printer port.*

* * * * *